United States Patent

[11] 3,572,728

| [72] | Inventor | Robert J. Smuland |
| | | Cincinnati, Ohio |
| [21] | Appl. No. | 737,720 |
| [22] | Filed | June 17, 1968 |
| [45] | Patented | Mar. 30, 1971 |
| [73] | Assignee | General Eelctric Company |

[54] ROTARY SEAL
1 Claim, 3 Drawing Figs.

[52] U.S. Cl. ..................................................... 277/57
[51] Int. Cl. ................................................ F16j 15/48,
F02f 11/00, F01d 1/04
[50] Field of Search ........................................... 277/53-
—57; 230/132

[56] References Cited
UNITED STATES PATENTS
1,505,647  8/1924  Junggren ...................... 277/55

2,279,863  4/1942  Downer ...................... 277/54X

FOREIGN PATENTS
13,004  0/1906  Great Britain ............... 277/56
111,897  12/1917  Great Britain ............... 277/53

*Primary Examiner*—Samuel G. Rothberg
*Attorneys*—Derek P. Lawrence, E. F. Berrier, Jr., Lee H. Sachs, Frank L. Neuhauser, Oscar B. Waddell and Melvin M. Goldenberg

ABSTRACT: An improved rotary seal having at least one seal tooth carried by a rotating or stationary member and extending into close or rubbing contact with a sealing surface carried by the other member and means downstream of the seal tooth to receive and direct leakage fluid toward the leakage passage to thereby increase the apparent downstream pressure, decrease the apparent pressure drop across the seal tooth and, hence, decrease the amount of fluid leakage across the seal tooth.

PATENTED MAR 30 1971 3,572,728
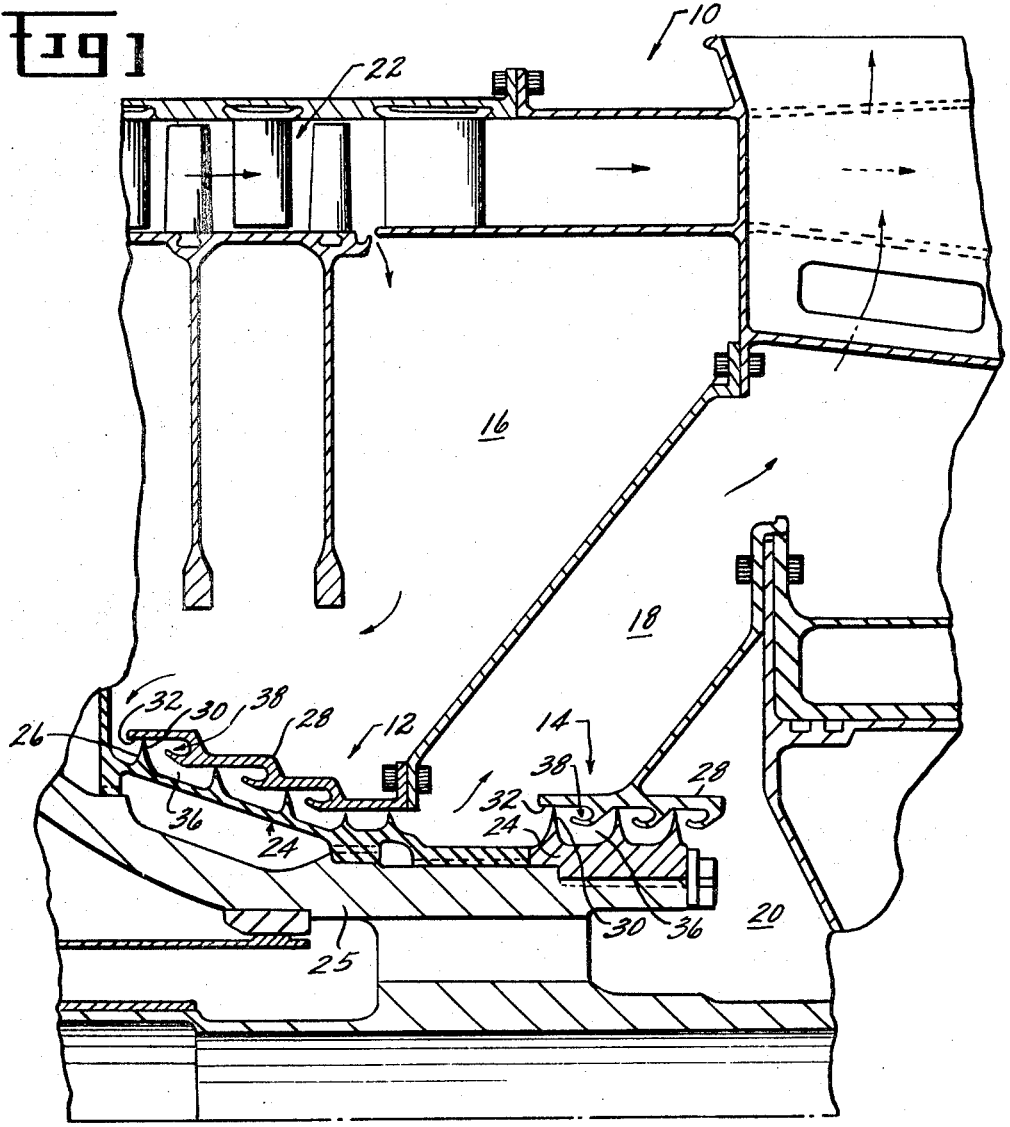
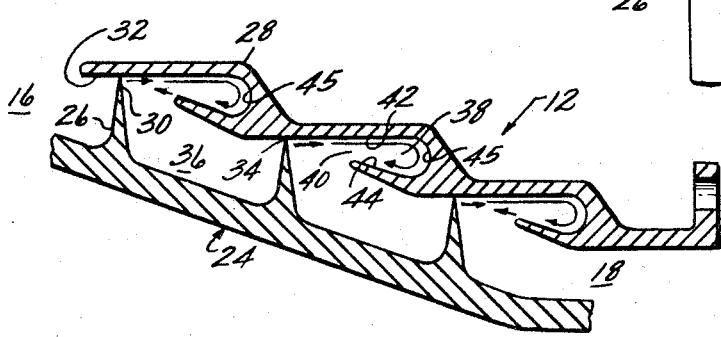
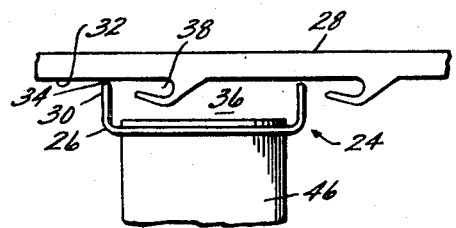
INVENTOR.
ROBERT J. SMULAND
*Erwin F. Bevin Jr.*
ATTORNEY

ROTARY SEAL

IMPROVED ROTARY SEAL

This invention relates to fluid seals and more particularly to an improved fluid seal for use between a stationary and a rotating member.

Rotary seals, such as labyrinth seals or honeycomb seals, have long been used in gas turbine engines and the like, for example, to restrict flow between rotating and stationary parts, to shield selective chambers or components from high-temperature fluids, and to prevent efficiency losses in the engine due to losses of compressed fluid, turbine driving or propulsive fluid. Such seals are commonly formed by a seal tooth or projection, carried by either the rotating or stationary member, which extends into close or actual rubbing contact with a cooperating sealing surface carried by the other member. Fluid leakage through such a seal is, of course, undesirable and is primarily a function of the seal tooth-sealing surface clearance or the size of the fluid leakage path or passage and the apparent pressure drop across the seal tooth. Apparent pressure drop may be defined as the pressure drop seen by the fluid on the upstream or high-pressure side of the seal tooth or the total upstream pressure less the apparent downstream pressure. For a given size fluid leakage passage, leakage flow increases with increased apparent pressure drop across the seal tooth. This invention is concerned with decreasing such leakage flow by turning the leakage flow back toward the seal tooth, thereby increasing the apparent downstream pressure in the vicinity of the leakage passage and decreasing the apparent pressure drop across the seal tooth.

A primary object of this invention is to provide an improved rotary fluid seal having means to reduce the apparent pressure drop across the seal tooth and, therefore, fluid leakage through the seal.

A more specific object of this invention is to provide an improved rotary fluid seal wherein flow of leakage fluid through the seal is captured and redirected generally toward the leakage passage to thereby increase the apparent pressure in the vicinity of the downstream end of the leakage passage, decrease the apparent pressure drop across the seal tooth and, hence, the fluid leakage through the seal.

Other objects and advantages of this invention will become apparent upon reading the following description of the preferred embodiments.

While the specification concludes with claims particularly pointing out and distinctly claiming the subject matter of this invention, it is believed the invention will be better understood from the following description of the preferred embodiments taken in connection with the accompanying drawings wherein:

FIG. 1 is a cross-sectional view of a portion of a gas turbine engine employing several embodiments of the improved rotary fluid seal of this invention;

FIG. 2 is an enlarged view of one of the embodiments of the fluid seal of FIG. 1; and FIG. 3 shows a further embodiment of the fluid seal of this invention employed in cooperation with a turbine or compressor rotor-blade assembly.

Like reference numerals will be used to refer to like parts throughout the following description of the preferred embodiments.

Referring now to the drawings and particularly to FIG. 1, a portion of an exemplary gas turbine engine has been shown at 10 employing several embodiments of the improved rotary fluid seal of this invention, as at 12 and 14, to reduce fluid leakage between compartments 16, 18 and 20. In the example shown, compartment 16 is annular and contains relatively high-pressure fluid derived from a compressor 22; compartment 18 is maintained at a lower pressure, for example, atmospheric; and compartment 20 is maintained at a subatmospheric pressure.

With reference now to FIGS. 1 and 2, the seal 12 has been shown as comprising a rotary member 24 suitably secured to a shaft 25 and formed with a plurality of annular, axially spaced projections or seal teeth 26 extending generally radially toward a stationary member 28. Each tooth 26 has a tip or peripheral edge 30 which is closely spaced to or in rubbing contact with a sealing surface 32 of the stationary member 28 and are together adapted to cooperatively form a relatively efficient fluid seal across each tooth 26. As shown in the drawings, the sealing surface 32 is preferably cylindrical so as to enable relative axial motion between the rotary member 24 and the stationary member 28 without degradation of sealing effectiveness.

It will be understood that even when the tooth and the sealing surface 32 are adapted for rubbing contact, a fluid leakage path or passage 34 will exist between the blade tip 30 and the sealing surface 32 through which the high-pressure fluid may leak, for example from chamber 16 to chamber 18 or from chamber 18 to chamber 20. The amount of such leakage, as previously mentioned, is a function of the size of the passage 34 and the apparent pressure drop across each tooth 26. Where the upstream pressure or, for example, the pressure in compartment 16 is great as compared to the downstream pressure or, for example, the pressure within the compartment 36 formed between the first two upstream teeth of seal 12 and the passage 34 is small, the velocity of the escaping fluid may be quite high and may approach sonic velocity.

In order to reduce the fluid flow through the passage 34, this invention provides means for receiving and directing the leakage fluid flow generally toward the tooth tip 30 or passage 34 to thereby increase the apparent downstream pressure and reduce the apparent pressure drop across each tooth 26. To this end, and with reference to the embodiment of FIG. 2, the stationary member 28 is formed with an annular chamber 38 immediately downstream or on the low-pressure side of each seal tooth 26 which has an opening or passage 40 generally facing its respective seal tooth and defined by annular sidewalls 42 and 44 and closure wall 45. One sidewall, such as sidewall 42, is adapted to guide the leakage fluid flow into the chamber 38 while the other sidewall, such as sidewall 44, is suitably inclined relative to the axis of rotation of the rotating member 24 so as to direct the fluid flow exiting from the chamber 38 generally toward the seal tooth tip 30 and passage 34 whereby the apparent downstream pressure is increased in the vicinity of the downstream end of the passage 34 and the apparent pressure drop across the seal tooth 26 and, hence, the amount of leakage across the seal is decreased. The closure wall 45 is suitably formed and faired in with sidewall 42 and 44 to effect or impart a turning of the fluid within the chamber 38. The above-mentioned leakage flow paths through the seal passages 34 and into and out of the chambers 38 have been generally indicated by appropriate arrows in FIG. 2, while the fluid flow through the compressor 22 and into chamber 16 has been indicated by appropriate arrows in FIG. 1.

Although the seal of FIG. 2 has been shown as being an axially stepped labyrinth-type seal, it should be understood that the seal may comprise only one seal tooth 26 and where more than one tooth is employed they may be of equal tip diameter as in the embodiment shown at 14 or of unequal diameter and arranged in either regular or irregular order. Further, it should be understood that although the seal teeth 26 have been shown as being carried by the rotating member 24 and the sealing surface 32 and chambers 38 carried by the stationary member 28, the arrangement may be varied.

Referring now to FIG. 3, the improved rotary seal of this invention has been shown as applied to a turbine or compressor rotor shroud casing sealing arrangement wherein a plurality of generally radially extending blades 46 are secured adjacent their tips by a suitable annular shroud or rotating member 24 having generally radial projections or seal teeth 26 extending therefrom into close or actual rubbing contact with a sealing surface 32 of the turbomachinery casing or stationary member 28. As with the embodiment of FIG. 2, the sealing surface 32 and the teeth 26 are adapted to cooperatively form a relatively efficient fluid seal across each tooth 26. In the embodiment of FIG. 3, a chamber 38 is provided downstream of each blade 26 to receive the leakage fluid escaping through the passage 34, which may be combustor produced hot gases, steam, or the like, and discharge such flow generally toward the tooth 26 and passage 34, thereby increasing the apparent downstream pressure, decreasing the apparent pressure drop across the seal tooth 26 and, hence, reducing leakage fluid flow through the seal.

Although several embodiments of the invention have been depicted and described, it should be understood that many additions, alterations, and variations may be made without departing from the invention's fundamental theme. Further, although the invention has been described as being particularly applicable to gas turbine engines, it should be understood that usage is not limited thereto and that the invention may be effectively employed in steam turbines and other devices which require a dynamic fluid seal between rotating and stationary members. Accordingly, the scope of the invention should be limited only by the scope of the following appended claims.

I claim:

1. An improved rotary seal for use between an outer stationary member and an inner rotating member, said stationary member formed with a cylindrical sealing surface, at least one annular seal tooth projecting generally radially from said rotating member into close-spaced relationship with said cylindrical sealing surface and defining a small, generally cylindrical fluid leakage passage therebetween, a closure wall carried by said stationary member downstream of said seal tooth for receiving fluid effluxing from said leakage passage and redirecting said leakage fluid in an upstream direction, an annular wall member joining and extending upstream of said closure wall and defining, in cooperation with said cylindrical sealing surface and said closure wall, an annular chamber having an opening adjacent the downstream end of said leakage passage, said annular wall member a having an outer peripheral surface which is inclined toward said sealing surface from said closure wall to said opening so as to direct said redirected leakage fluid from said chamber opening to the downstream end of said leakage passage, whereby the apparent pressure at the downstream end of said leakage passage is increased and the seal effectiveness is enhanced.